United States Patent [19]

Ono et al.

[11] Patent Number: 4,568,600
[45] Date of Patent: Feb. 4, 1986

[54] THERMOPLASTIC RESIN BASE FILM FOR MAGNETIC RECORDING MEDIUM

[75] Inventors: Masaaki Ono, Omihachiman; Masahiko Motegi, Hikone; Kazuo Okabe, Shiga, all of Japan

[73] Assignee: Toray Industries, Inc., Tokyo, Japan

[21] Appl. No.: 703,311

[22] Filed: Feb. 20, 1985

[30] Foreign Application Priority Data

Feb. 29, 1984 [JP] Japan .................................. 59-35882

[51] Int. Cl.⁴ ............................................. H01F 10/04
[52] U.S. Cl. .................................. 428/145; 428/147; 428/149; 428/152; 428/201; 428/206; 428/327; 428/330; 428/333; 428/336; 428/447; 428/480; 428/481; 428/483; 428/694; 428/900; 428/910
[58] Field of Search ............... 428/145, 147, 149, 152, 428/201, 206, 327, 330, 333, 336, 447, 480, 481, 483, 694, 900, 910

[56] References Cited

U.S. PATENT DOCUMENTS 4,233,352 11/1980 Ono et al. ............................ 428/147
4,489,117 12/1984 Ono et al. ............................ 428/147

FOREIGN PATENT DOCUMENTS

88634A2 9/1983 European Pat. Off. .

Primary Examiner—Marion C. McCamish
Attorney, Agent, or Firm—Austin R. Miller

[57] ABSTRACT

A thermoplastic resin base film for a magnetic recording medium including a thermoplastic resin film and a discontinuous film adhering closely to at least one surface of the thermoplastic resin film. The discontinuous film has a thickness of not larger than 500 angstroms and is composed of a polymer blend containing fine particles. The polymer blend comprises a water-soluble polyester copolymer and a water-soluble polymer having at least one hydroxyl group in the recurring unit thereof. Fine protrusions are formed on the discontinuous film due to the presence of the fine particles therein. A magnetic recording medium using the base film is suitable for high density magnetic recording and has extremely excellent durability to repeated use.

17 Claims, 3 Drawing Figures

THERMOPLASTIC RESIN BASE FILM FOR MAGNETIC RECORDING MEDIUM

BACKGROUND OF THE INVENTION (1) Field of the Invention

This invention relates to a thermoplastic resin base film for a magnetic recording medium, particularly to a thermoplastic resin base film for a magnetic recording medium which is suitable for high density recording. More particularly, it relates to a thermoplastic resin base film suitable for a metallized film video tape.

(2) Description of the Related Art

A metallized film video tape including a thermoplastic resin film having a magnetic material vacuum-deposited on the surface thereof is capable of super-high-density magnetic recording. Since the magnetic metal layer of the metallized film video tape is very thin, the surface configuration of the base film used is completely reproduced on the surface of the metallized film tape. Accordingly, if the surface roughness of the base film is large, the electromagnetic transformation performances of the metallized film video tape are extremely reduced.

In view of the electromagnetic transformation performances, a base film having a smooth mirror surface is preferred. However, since a vacuum-deposited metal film formed on such a base film has the same mirror surface as the base film, the slip characteristics of the metal layer surface are extremely poor. Unless, for example, a protective film layer is formed on the vacuum-deposited metal film, many scratches are inevitably produced on the surface of the metal film in the tape-forming process after the vacuum evaporation step, rendering the metallized film video tape useless for practical purposes.

The running property of the vacuum-deposited layer side of the metallized film video tape is another serious problem during the practical use thereof. In the case of a video tape of the coating type, which is prepared by coating a base film with an organic polymer binder having a magnetic powder incorporated therein, it is possible to improve the running property of the magnetic layer side of the tape by incorporating a lubricant into the organic polymer binder. On the other hand, in the case of a video tape of the metal vacuum deposition type, the running property of the vacuum-deposited layer side is generally inferior unless a protective film layer is formed on the metal film layer. It is, however, difficult to form a uniform protective film layer on the surface of the vacuum-deposited metal film. Therefore, for a metallized film video tape in which no protective film layer is formed, it is impossible to improve the running property of the vacuum-deposited layer surface, especially under the severe conditions during practical use thereof.

As a base film in which the foregoing defect is eliminated, there is the base film described in Japanese Unexamined Patent Publication (Kokai) No. 58-62826. This base film includes a polyester film having on at least one surface thereof a discontinuous film composed mainly of a water-soluble polymer and having a thickness of not larger than 500 Å. The discontinuous film imparts excellent smoothness, slip characteristics, and scratch resistance to a magnetic metal thin film formed thereon. This base film is, however, disadvantageous in that the slip characteristics and scratch resistance are degraded under high temperature and high humidity conditions. This defect can be eliminated by incorporating fine particles into the discontinuous film. However, it was found that when a metallized film video tape including such a base film, is subjected to repeated recording and reproduction operations, for example, 1000 times or more, the fine particles are liable to fall off from the discontinuous film and peeling is liable to occur of the vacuum-deposited magnetic metal thin film layer from the discontinuous film layer and of the discontinuous film from the base film surface might occur.

SUMMARY OF THE INVENTION

An object of the present invention is to provide a base film for a magnetic recording medium, on which a vacuum-deposited metal thin film can be formed which cannot be peeled or scraped off even when subjected to repeated recording and reproduction operations, e.g., 1000 times or more, and hence is excellent in durability.

Another object of the present invention is to provide a base film for a magnetic recording medium, which has the above-mentioned excellent properties even when subjected to repeated recording and reproduction operations under high temperature and high humidity conditions.

A further object of the present invention is to provide a base film for a video tape, on which a magnetic film layer capable of high density magnetic recording is formed by vacuum deposition of metal.

A still further object of the present invention is to provide a base film suitable for an 8 mm video tape.

That is, the present invention relates to a thermoplastic resin base film for a magnetic recording medium including a thermoplastic resin film and a discontinuous film adhering closely to at least one surface of the thermoplastic resin film, the discontinuous film having a thickness of not larger than 500 angstroms and comprising a polymer blend containing fine particles having a particle size of 30 to 500 angstroms, the polymer blend comprising 20% to 95% by weight of a water-soluble polyester copolymer and 80% to 5% by weight of a water-soluble polymer having at least one hydroxyl group in the recurring unit thereof, the fine particles being contained in an amount of 5% to 50% by weight based on the amount of the polymer blend, wherein fine protrusions are formed on the discontinuous film due to the presence of the fine particles therein.

DESCRIPTION OF THE PREFERRED EMBODIMENT

Figure 1:
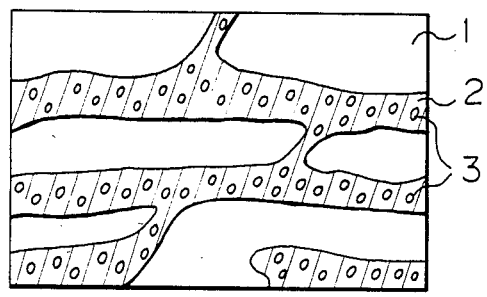
FIG. 1 is a plane view diagrammatically illustrating a discontinuous film partially covering the surface of the thermoplastic resin film of the present invention. This drawing diagrammatically shows the state of the discontinuous film on the surface of which fine protrusions are formed by incorporating the fine particles into the polymer blend of the present invention constituting the discontinuous film.

The thermoplastic resin film used in the present invention is a thermoplastic resin film formed by a customary method, namely, a film formed by melting a thermoplastic resin, extruding the melt in the form of sheet and drawing the extrudate in at least one direction. From the viewpoint of the mechanical characteristics, a biaxially stretched and oriented film of the ordinary balanced type, a further monoaxially strengthened film of the tensilized type, or a further biaxially strengthened film of the tensilized type is preferred. It is preferable that the surface of the thermoplastic resin film used be smooth. More specifically, it is preferable that the surface roughness of the thermoplastic resin film be such that the value Ra is not more than 0.015 μ, preferably 0.010 to 0.002 μ at the cut-off value of 0.08 mm.

The Ra value is the arithmetic mean of the absolute values of the heights on depths of the surface roughness curve obtained by eliminating a certain amount of waviness from the profile curve obtained by a stylus-type surface roughness tester by adopting a proper cut-off value from the center line, which is determined so that the area of the portion above the central line is equal to the area of the portion below the central line (DIN 4768).

The thermoplastic resin used for the preparation of the base film is not particularly critical, so far as it is useful for the objects of the present invention. Typical examples of the thermoplastic resin include polyesters, polyphenylene sulfides and polyamides. Among these polymers, polyesters and polyphenylene sulfides are preferred. The polyester used is not particularly critical, so far as it is composed mainly of a linear polyester. The polyester in the present invention is polymers obtained by the polycondensation of aromatic dicarboxylic acids and glycols. Said polyester can be prepared by the direct polycondensation of aromatic dicarboxylic acids and glycols, by the ester exchange reaction of carboxylic acid dialkyl esters and glycols followed by the polycondensation of the reaction products, or by the polycondensation of diglycol esters of aromatic dicarboxylic acids. As typical instances, there can be mentioned polyethylene terephthalate, polytetramethylene terephthalate, poly-1,4-cyclohexylenedimethylene terephthalate, polyethylene-2,6-naphthalenedicarboxylate, polyethylene p-hydroxybenzoate, and polyethylene-α,β-bis(2-chlorophenoxy)ethane-4,4'-dicarboxylate.

The polyester may be either a homopolyester or a copolyester. In case of a copolyester, as the comonomers to be copolymerized with the monomers of the above-listed polyesters for the preparation of the copolyesters, there can be mentioned diol components such as diethylene glycol, propylene glycol, neopentyl glycol, polyethylene glycol, p-xylylene glycol, and 1,4-cyclohexane dimethanol, and dicarboxylic acid components such as adipic acid, sebacic acid, phthalic acid, isophthalic acid and 2,6-naphthalene-dicarboxylic acid. It is preferable that the amount of these comonomers used for the copolymerization be up to 20 mol %.

Internal particles (generated particles) formed by the polymerization catalyst residue or inactive particles externally added, which form protrusions on the film surfaces when the polyester film is drawn, may be contained in the polyester. The content of these particles is such that when the polymer is biaxially stretched into a thickness of not more than 30 μ, the haze of the formed film is not more than 5%.

The discontinuous film of the present ivention is formed of a composition including as main components a polymer blend and fine particles. The discontinuous film composition further contains preferably a silane coupling reagent or a titanium coupling reagent.

In order to impart satisfactory durability under extremely severe operative environments (high temperature and high humidity) to a vacuum-deposited film formed on the discontinuous film, fine particles having a particle size of 50 to 500 angstroms should be included in the polymer blend, which is a discontinuous film-forming resin, in an amount of 5% to 50% by weight, preferably 10% to 40% by weight, based on the amount of the polymer blend.

The thickness of the discontinuous film of the present invention is not larger than 500 angstroms and preferably 50 to 300 angstroms. If the thickness of the discontinuous film exceeds 500 angstmoms, the electromagnetic transformation performances, especially the signal-to-noise (S/N) ratio, of the vacuum-deposited film are degraded.

The polymer blend which is one of the discontinuous film-forming constituents of the present invention is one containing, as a main component, a water-soluble polyester copolymer in an amount of 20% to 95% by weight, preferably 50% to 80% by weight, and a water-soluble polymer having at least one hydroxyl group in the recurring unit thereof in amount of 80% to 5% by weight, preferably 50% to 20% by weight. As the water-soluble polyester copolymer, there may be used, for example, polyester copolymers polymerized by using alkali metal sulfonate of aromatic dicarboxylic acid as one of the components of monomers. More specifically, among polyester copolymers polymerized by use of dicarboxylic acids and glycols as monomers, water-soluble polyester ether polymerized by use of 5-sodium sulfonate-isophthalic acid and diethylene glycol as parts of the monomers is especially preferable.

The dicarboxylic acid monomer components constituting the polyester copolymer preferably include 2 to 50 mol % of 5-sodium sulfonate-isophthalic acid, and other acids selected from the group consisting of terephthalic acid, isophthalic acid, adipic acid, and mixtures thereof. The glycol monomer components constituting the polyester copolymer most preferably include 30 to 100 mol % of diethylene glycol, and other glycols selected from alkylene glycols having 2 to 8 carbon atoms, especially ethylene glycol. Such water-soluble polyester copolymers preferably have a tensile elongation of not less than 300%, although this is not especially critical.

The water-soluble polyester copolymer of the present invention has an excellent ability to retain fine particles. The polymer blend component other than the water-soluble polyester copolymer is a water-soluble polymer which is capable of being uniformly blended with the water-soluble polyester copolymer without causing phase separation and has a discontinuous film-forming property. As such a polymer, there can be mentioned water-soluble polymer containing at least one hydroxyl group in the recurring unit thereof. Although not especially critical, the water-soluble polymer preferably has a molecular weight of 10,000 to 2,000,000, more preferably 100,000 to 1,000,000. If the molecular weight of the water soluble polymer is lower than 10,000, the film becomes soft and the durability tends to become poor. If the molecular weight of the water-soluble polymer is higher than 2,000,000, the film is too rigid and becomes brittle, and the durability tends to become poor. This is not particularly critical, however the water-soluble polymer usually have a tensile elongation of not greater than 250%. As such water-soluble polymers, there can be used, for example, polyvinyl alcohol, methyl cellulose, hydroxyethyl cellulose, and carboxymethyl cellulose. Among these polymers, cellulose type water-soluble polymers are preferable.

The water-soluble polyester copolymer of the present invention is effective for improving the bonding strength between the discontinuous film and the thermoplastic resin film and for increasing the adhesion strength between the discontinuous film and the magnetic metal thin film vacuum-deposited thereon. Furthermore, the water-soluble polyester copolymer is effective for remarkably improving the bonding strength between the discontinuous film and the fine particles incorporated therein for the purpose of improving the running property of the vacuum-deposited film surface under the above-mentioned severe conditions, thereby preventing the fine particles from falling off therefrom.

In order to attain more complete prevention of falling-off of the fine particles from the discontinuous film, it is preferred that a silane coupling reagent or a titanium coupling reagent be incorporated in the discontinuous film-forming constituents.

As the silane coupling reagent, there is used an organic silicon monomer having in the molecule at least two different reactive groups. As one reactive group, there can be mentioned methoxy, ethoxy, and silanol groups, and as the other reactive group, there can be mentioned vinyl, epoxy, methacryl, amino, and mercapto groups. The reactive groups used are selected from those which are capable of being linked with the side chain and terminal groups of the polymer blend constituents and further with the base film. As specific examples of the silane coupling reagent used, there can be mentioned vinyltrichlorosilane, vinyltriethoxysilane, vinyl-tris ($\beta$-methoxyethoxy) silane, $\gamma$-glycidoxypropyltrimethoxysilane, $\gamma$-methacryloxypropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane, and $\gamma$-aminopropyltriethoxysilane.

As specific examples of the titanium coupling reagent used, there can be mentioned tetra-i-propoxy titanium, tetra-n-butoxy titanium and i-propoxy titanium dimethacrylate stearate.

In the case where the silane coupling reagent or the titanium coupling reagent is used, it is preferably used in an amount of 2% to 50% by weight, more preferably 3% to 30% by weight, based on the amount of the polymer blend.

The fine particles, which are incorporated in the discontinuous film-forming resin, i.e., the polymer blend, in order to improve the durability of the vacuum-deposited film under severe conditions such as high temperature and high humidity, have a particle size of 30 to 500 angstroms, preferably 50 to 400 angstroms. By the "particle size" referred to herein is meant the maximum particle size of fine particles. If the particle size of the fine particles is less than 30 angstroms, the running property of the magnetic recording medium obtained by vacuum-depositing a magnetic material over the discontinuous film-formed surface of the thermoplastic resin base film of the present invention is not improved. On the other hand, if the particle size of the fine particles is more than 500 angstroms, the electromagnetic transformation performances of the vacuum-deposited magnetic medium are degraded. The fine particles may have a spherical, ellipsoidal, rectangular or cubic shape. As the fine particles, there can be used inorganic compound fine particles, e.g., MgO, ZnO, MgCO$_3$, CaCO, CaSO$_4$, BaSO$_4$, Al$_2$O$_3$, SiO$_2$, and TiO$_2$. The fine particles may be used in the form of a mixture of two or more of the above-mentioned compounds and salts. SiO$_2$, CaCO$_3$, Al$_2$O$_3$, and TiO$_2$ particles are preferably used as the fine particles.

The fine particles are present in the discontinuous film and on the surface of the discontinuous film. The number of the fine particles present is preferably from $10^4$ to $10^{11}$/mm$^2$, though it is not particularly limited to this range. The particle size and number of the fine particles can be determined by observation under an electron microscope.

The content of the fine particles is in the range of from 5% to 50% by weight, preferably from 8% to 40% by weight, based on the amount of the polymer blend. If the content of the fine particles is too large, falling-off of the particles from the discontinuous film becomes remarkable, and the electromagnetic transformation performances, especially the S/N ratio, of the vacuum-deposited magnetic film, are undesirably degraded. On the other hand, if the addition amount of the fine particles is too small, the durability of the discontinuous film under high temperature and high humidity conditions is undesirably reduced.

The thermoplastic resin base film for a magnetic recording medium according to the present invention will be explained, below, with reference to the drawings.

The discontinuous film of the present invention refers to a film partially covering the surface of the thermoplastic resin film as observed by an electron microscope. FIG. 1 is a plane view diagrammatically illustrating a discontinuous film partially covering the surface of the thermoplastic resin film. This drawing shows the state of the discontinuous film on the surface of which fine protrusions are formed by incorporating the fine particles into the discontinuous film of the polymer blend. This state can be observed by an electron microscope at more than 10,000 magnifications.

Figure 2:
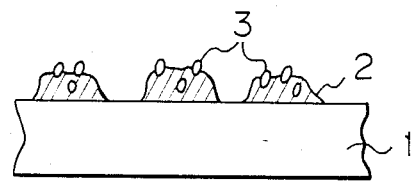
FIG. 2 is a diagrammatic section view of the film shown in FIG. 1.

FIG. 2 is a section view diagrammatically illustrating the film disclosed in FIG. 1. In FIGS. 1 and 2, reference numeral 1 denotes a thermoplastic resin film, 2 a discontinuous film composed of the polymer blend, and 3 fine particles.

Figure 3:
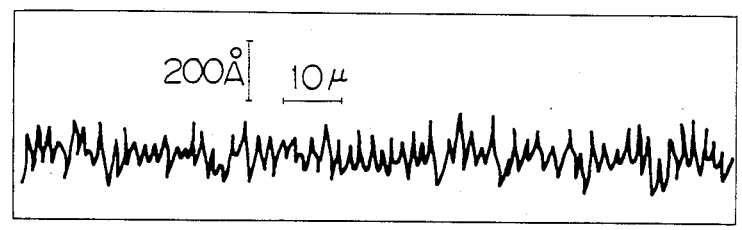
FIG. 3 is a surface roughness curve chart of a discontinuous film formed according to the present invention, as measured by a stylus-type surface roughness tester at 500,000 magnifications in the thickness direction.

The thickness of the discontinuous film is measured by determining a surface roughness curve of the discontinuous film-formed surface by a stylus-type surface roughness tester with a stylus having a small tip diameter at a cut-off value of 0.08 mm at 500,000 magnifications in the direction perpendicular to the film surface, and measuring the mean distance between the peak and the valley in the so-determined surface roughness curve except portions of peaks due to the fine particles (FIG. 3).

To produce a magnetic recording medium using the thermoplastic resin base film of the present invention, a ferromagnetic material thin film is formed over the discontinuous film-formed surface of the thermoplastic resin base film of the present invention.

Magnetic recording tape characteristics are evaluated by using a commercially available video tape recorder (VTR) of the VHS system.

For evaluation of the durability of the magnetic material side of the tape, the tape is subjected to a running operation for reproduction many times, i.e., 1000 times, repeatedly under normal temperature and normal humidity conditions and under high temperature and high humidity conditions, respectively. After this running operation, scratches formed on the magnetic material side of the tape are observed, and the scratch resistance is evaluated according to the following rating:

⊚ : no substantial formation of scratches on magnetic film surface of tape o: formation of very small scratches on magnetic film surface of tape X: formation of large scratches on magnetic film surface of tape and peeling vacuum-deposited magnetic film XX: formation of large scratches on magnetic film surface of tape and peeling of discontinuous film from base film By "normal temperature and normal humidity conditions" is meant conditions of a temperature of 25° C. and a relative humidity of 60%. By "high temperature and high humidity conditions" is meant conditions of a temperature of 50° C. and a relative humidity of 80%.

The S/N ratio is determined by recording a 50% white level signal at an optimum recording current for the tape to be tested, by determining the ratio of the signal to the noise contained in a video demodulation signal at the time of reproduction by using a video noise meter and by comparing the resultant ratio with that of a commercially available VHS standard tape as 0 dB.

The drop-out characteristic is determined by recording a three-staged step wave at an optimum recording current on the magnetic recording tape to be tested, counting the number of drop-outs in which the attenuation quantity of the video output at the time of reproduction is higher than 18 dB and the duration time is longer than 20 μsec and calculating a mean value per minute. The S/N ratio and drop-out measurements are carried out under normal temperature and normal humidity conditions.

The process for the production of the base film of the present invention will now be described. A coating liquid, usually an aqueous solution, of the above-mentioned polymer blend, which contains fine particles, preferably in combination with a silane coupling reagent or titanium coupling reagent, is coated and dried on at least one surface of a smooth thermoplastic resin film uniaxially drawn according to a customary method. The coated film is then drawn in a direction perpendicular to the direction of the above-mentioned uniaxial drawing. Optionally, after this drawing, the film is further drawn in the same direction as the direction of the above-mentioned uniaxial drawing or in the same directions as the directions of the above-mentioned biaxial drawing. Then, the drawn film is subjected to heat treatment. Thus, a discontinuous film containing the fine particles is formed on the thermoplastic resin film.

This production process will be described in more detail by taking a polyester film as an example of the thermoplastic resin film. A starting polyester as described hereinabove is melt-extruded by a customary film-forming machine, and the extrudate is cooled and drawn in the longitudinal direction at a drawn ratio of 3 to 5. At least one surface of the longitudinally drawn film is coated with the above-mentioned coating liquid according to a known coating method before the preheating and transverse drawing steps. The amount of the coating liquid coated on one surface is preferably 3 to 1,000 mg/m² as the solid content. Then, the coated and longitudinally drawn film is transversely drawn. In order to complete formation of a film from the coating liquid before the transverse drawing, it is necessary to completely evaporate water contained in the coating liquid on the surface of the film. This is accomplished by preheating at a hot air temperature of 100° C. to 150° C. in a stenter preheating zone of the biaxial drawing machine so that the water drying rate is in the range of from 5% to 100%/sec. Then, the film is transversely drawn at a drawing temperature of 90° C. to 120° C. and a draw ratio of 2.5 to 4.5. By the transverse drawing conducted after completion of drying and formation of the film, a discontinuous film is formed on at least one surface of the film. Since the coating liquid contains the fine particles, the resultant discontinuous film has fine protrusions formed due to the presence of the fine particles therein. Then, the transversely drawn film is heat-treated at 180° C. to 220° C., or, if necessary, the transversely drawn film is drawn again in the longitudinal direction at a draw ratio of 1.1 to 1.8 and is then heat-treated at 180° C. to 220° C., whereby a biaxially drawn polyester film having on at least one surface thereof a discontinuous film having a thickness smaller than 500 angstroms is obtained.

In the foregoing, a single layer film has been described. In the production of a composite film by co-extrusion of two kinds of materials, one of which is capable of forming a smooth surface and the other of which includes fine particles capable of providing a slippery surface, the technique of the present invention as described hereinabove may be applied to the smooth surface.

For formation of a magnetic recording medium using the thermoplastic resin base film of the present invention, a ferromagnetic substance, such as Fe, Co, Ni, an alloy thereof, or an alloy of such a metal with other nonmagnetic material is formed on the discontinuous film-formed surface of the base film prepared by the above-mentioned process in the form of a thin film preferably having a thickness of 500 to 2000 angstroms by vacuum evaporation, sputtering, or plating. The so-obtained magnetic recording medium is cut into a desired shape.

The thus-obtained magnetic recording medium using the base film of the present invention is advantageous in that the magnetic film surface is slippery, the electromagnetic transformation performances are excellent, no peeling of the magnetic film from the base film occurs even under high temperature and high humidity conditions, and the durability is excellent even if the recording medium is repeatedly used 1000 times or more.

As described hereinabove, since the discontinuous film of the present invention includes the water-soluble polyester copolymer as the essential component, little falling-off of the fine particles occurs and the durability of the magnetic thin film vacuum-deposited over the discontinuous film-formed surface of the base film is significantly improved.

The thermoplastic resin base film of the present invention is useful as a base film for a magnetic recording medium, especially a video tape of the ferromagnetic metal vacuum deposition type, more preferably an 8 mm video tape.

The production of the base film of the present invention and the application of the base film to a magnetic recording tape will now be described with reference to the following examples, which by no means limit the scope of the invention.

EXAMPLE 1

Polyethylene terephthalate, which was substantially free of internal particles derived from the polymerization catalyst residue and was substantially non-oriented and non-crystalline was melt-extruded onto a rotary casting drum maintained at about 20° C. The extrudate was drawn at a draw ratio of 3.4 in the machine direction. Both the surfaces of the film were coated at a solid content of 20 mg/m$^2$ with the following aqueous solution by using a metering bar coater.

A mixed aqueous solution including:

Water-soluble polyester copolymer [a copolymer obtained by the polycondensation of acids comprising 40 mol % of terephthalic acid, 33 mol % of isophthalic acid, 20 mol % of adipic acid, and 7 mol % of 5-sodium sulfonate-isophthalic acid and glycols comprising 40 mol % of diethylene glycol and 60 mol % of ethylene glycol. Tensile elongation: 400%]: 0.35 wt. %

Methyl cellulose (tensile elongation: 50%): 0.15 wt. %

Ultra-finely divided silica particles having an average particle size of 160 angstroms: 0.14 wt. %

Thereafter, the coated film was passed through a stenter to effect drying, preheating, and transverse drawing. The preparation, drying, preheating, and drawing were carried out at a temperature of 115° C. and the water evaporation rate was 15%/sec.

The film was transversely drawn at a draw ratio of 3.4 and heat-treated at 200° C. Thus, a polyethylene terephthalate film having a thickness of 12 $\mu$, on both the front and back surfaces of which a discontinuous film having a thickness of 180 angstroms and containing the fine particles and having protrusions due to the presence of the fine particles was formed, was obtained.

A cobalt-nickel alloy film having a thickness of 1,500 angstroms was formed on one surface of the obtained film by vacuum deposition. The film was cut into a predetermined width in the machine direction to form a magnetic tape. The properties of the magnetic tape are shown in Table 1.

EXAMPLE 2

A polyethylene terephthalate film having a thickness of 12 $\mu$, on both the front and back surfaces of which a discontinuous film having a thickness of 180 angstroms and containing the fine particles and having protrusions due to the presence of the fine particles was formed, was prepared in the same manner as described in Example 1, except that 0.15% by weight of N-$\beta$-(aminoethyl)-$\gamma$-aminopropylmethyldimethoxysilane as the silane coupling reagent was further added to the mixed aqueous solution used in Example 1.

A vacuum-deposited magnetic tape was prepared by using this base film in the same manner as described in Example 1. The properties of the tape are shown in Table 1.

EXAMPLE 3

A polyethylene terephthalate film having a thickness of 12 $\mu$, on both the front and back surfaces of which a discontinuous film having a thickness of 300 angstroms and containing fine particles and having protrusions due to the presence of the fine particles was formed, was prepared in the same manner as described in Example 2, except that 0.15% by weight of ultra-fine particles of calcium carbonate having an average particle size of 300 angstroms were used instead of the fine particles of silica used in Example 2.

A vacuum-deposited magnetic tape was prepared by using this base film in the same manner as described in Example 1. The properties of the tape are shown in Table 1.

COMPARATIVE EXAMPLE 1

A polyethylene terephthalate film having a thickness of 12 $\mu$, on both the front and back surfaces of which a discontinuous film having a thickness of 600 angstroms was formed, was prepared in the same manner as described in Example 1, except that the concentration of methyl cellulose in the mixed aqueous solution was changed to 0.40% by weight.

A vacuum-deposited magnetic tape was prepared by using this base film in the same manner as described in Example 1. The properties of the tape are shown in Table 1.

COMPARATIVE EXAMPLE 2

A polyethylene terephthalate film having a thickness of 12 $\mu$, on both the surfaces of which a discontinuous film having a thickness of 170 angstroms was formed, was prepared in the same manner as described in Example 1 except that the water-soluble polyester copolymer was not used.

A vacuum-deposited magnetic tape was prepared by using this base film in the same manner as described in Example 1. The properties of the tape are shown in Table 1.

COMPARATIVE EXAMPLE 3

A polyethylene terephthalate film having a thickness of 12 $\mu$, on both the surfaces of which a discontinuous film having a thickness of 300 angstroms and containing the fine particles and having protrusions due to the presence of the fine particles was formed, was prepared in the same manner as described in Example 3, except that the water-soluble polyester copolymer was not used.

A vacuum-deposited magnetic tape was prepared by using this base film in the same manner as described in Example 1. The properties of the tape are shown in Table 1.

As is apparent from the results shown in Table 1, a magnetic tape prepared by forming a vacuum-deposited ferromagnetic film over the discontinuous film-formed surface of the thermoplastic resin base film of the present invention has a remarkably excellent durability. Furthermore, the magnetic tape has excellent electromagnetic transformation performances.

TABLE 1

| | Surface structure of base film | | Properties of magnetic tape | | | |
|---|---|---|---|---|---|---|
| | | | Durability of magnetic film | | Electromagnetic transformation performance | |
| | Discontinuous film layer thickness (Å) | Average size of fine particles (Å) | Normal temperature and normal humidity | High temperature and high humidity | S/N ratio (dB) | Drop-out number/min |
| Example 1 | 180 | 160 | o~ | o~ | +19 | 30 |
| Example 2 | 180 | 160 | | | +19 | 15 |
| Example 3 | 300 | 300 | | | +10 | 28 |
| Comparative Example 1 | 600 | 160 | o~ | o~ | −10 | 95 |
| Comparative Example 2 | 170 | 160 | X~XX | XX | −12 | 130 |
| Comparative Example 3 | 300 | 300 | X~XX | XX | −15 | 135 |

We claim:

1. A thermoplastic resin base film for a magnetic recording medium comprising a thermoplastic resin film and a discontinuous film adhering closely to at least one surface of said thermoplastic resin film, said discontinuous film having a thickness of not larger than 500 angstroms and comprising a polymer blend containing fine particles having a particle size of 30 to 500 angstroms, said polymer blend comprising 20% to 95% by weight of a water-soluble polyester copolymer and 80% to 5% by weight of a water-soluble polymer having at least one hydroxyl group in the recurring unit thereof, said fine particles being contained in an amount of 5% to 50% by weight based on the amount of said polymer blend, wherein fine protrusions are formed on said discontinuous film due to the presence of said fine particles therein.

2. A thermoplastic resin base film for a magnetic recording medium according to claim 1, wherein the thermoplastic resin film is a polyester film.

3. A thermoplastic resin base film for a magnetic recording medium according to claim 1, wherein the thermoplastic resin film is a biaxially oriented polyethylene terephthalate film.

4. A thermoplastic resin base film for a magnetic recording medium according to claim 1, wherein the discontinuous film is formed on both the surfaces of the thermoplastic resin film.

5. A thermoplastic resin base film for a magnetic recording medium according to claim 1, wherein the fine particles are inorganic fine particles.

6. A thermoplastic resin base film for a magnetic recording medium according to claim 1, wherein the fine particles are fine particles of at least one member selected from the group consisting of $SiO_2$, $CaCO_3$, $Al_2O_3$, and $TiO_2$.

7. A thermoplastic resin base film for a magnetic recording medium according to claim 1, wherein the particle size of the fine particles is in the range of from 50 to 400 angstroms.

8. A thermoplastic resin base film for a magnetic recording medium according to claim 1, wherein the water-soluble polyester copolymer is a polyester copolymer comprising a polycondensation product of dicarboxylic acids and glycols, and a part of the dicarboxylic acids is 5-sodium sulfonate-isophthalic acid and a part of the glycols is diethylene glycol.

9. A thermoplastic resin base film for a magnetic recording medium according to claim 8, wherein the content of the 5-sodium sulfonate-isophthalic acid constituent is from 2 to 50 mol % based on the amount of the dicarboxylic acid component of the water-soluble polyester copolymer.

10. A thermoplastic resin base film for a magnetic recording medium according to claim 8, wherein the content of the diethylene glycol constituent is from 30 to 100 mol % based on the amount of the glycol component.

11. A thermoplastic resin base film for a magnetic recording medium according to claim 8, wherein the dicarboxylic acid constituent other than 5-sodium sulfonate-isophthalic acid is at least one acid constituent selected from the group consisting of terephthalic acid, isophthalic acid, and adipic acid.

12. A thermoplastic resin base film for a magnetic recording medium according to claim 8, wherein the glycol constituent other than diethylene glycol is an alkylene glycol having 2 to 8 carbon atoms.

13. A thermoplastic resin base film for a magnetic recording medium according to claim 8, wherein the glycol constituent other than diethylene glycol is ethylene glycol.

14. A thermoplastic resin base film for a magnetic recording medium according to claim 1, wherein the water-soluble polymer having at least one hydroxyl group in the recurring unit thereof is at least one member selected from the group consisting of methyl cellulose, hydroxyethyl cellulose, carboxymethyl cellulose, and polyvinyl alcohol.

15. A thermoplastic resin base film for a magnetic recording medium according to claim 1, wherein the water-soluble polymer having at least one hydroxyl group in the recurring unit thereof is at least one cellulose type water-soluble polymer selected from the group consisting of methyl cellulose, hydroxyethyl cellulose and carboxymethyl cellulose.

16. A thermoplastic resin base film for a magnetic recording medium according to claim 1, wherein the polymer blend further contains at least one member selected from the group consisting of silane coupling reagents and titanium coupling reagents in an amount of 2% to 50% by weight based on the total amount of the polymer blend.

17. A thermoplastic resin base film for a magnetic recording medium according to claim 1, wherein the polymer blend further contains a silane coupling reagent in an amount of 2% to 50% by weight based on the total amount of the polymer blend.

* * * * *